(12) United States Patent
Penner (10) Patent No.: US 10,096,272 B2
(45) Date of Patent: Oct. 9, 2018

(54) CART, KIOSK, BOOTH, EQUIPMENT OR MACHINE INTEGRATED WITH AN INFLATABLE AND DEFLATABLE ADVERTISING, IDENTIFYING DISPLAY

(71) Applicant: Roy M. Penner, Pittsburgh, PA (US)

(72) Inventor: Roy M. Penner, Pittsburgh, PA (US)

( * ) Notice: Subject to any disclaimer, the term of this patent is extended or adjusted under 35 U.S.C. 154(b) by 0 days.

(21) Appl. No.: 15/806,566

(22) Filed: Nov. 8, 2017

(65) Prior Publication Data

US 2018/0144670 A1    May 24, 2018

Related U.S. Application Data

(60) Provisional application No. 62/425,378, filed on Nov. 22, 2016.

(51) Int. Cl.

| | |
|---|---|
| B62B 1/00 | (2006.01) |
| G06F 15/00 | (2006.01) |
| G09F 19/08 | (2006.01) |
| A63H 3/06 | (2006.01) |
| G09F 23/00 | (2006.01) |
| G09F 19/00 | (2006.01) |
| G09F 21/04 | (2006.01) |
| G09F 13/00 | (2006.01) |
| B60P 3/025 | (2006.01) |
| G09F 23/06 | (2006.01) |
| G09F 13/04 | (2006.01) |
| A47F 1/04 | (2006.01) |
| A47F 5/10 | (2006.01) |

(52) U.S. Cl.
CPC ............ *G09F 23/00* (2013.01); *B60P 3/0257* (2013.01); *G09F 13/00* (2013.01); *G09F 13/04* (2013.01); *G09F 19/00* (2013.01); *G09F 21/045* (2013.01); *G09F 23/06* (2013.01); *A47F 1/04* (2013.01); *A47F 5/108* (2013.01)

(58) Field of Classification Search
CPC ...... G09F 15/0025; G09F 13/02; G09F 13/22; A63G 31/12; A63H 3/06; A47B 31/00; A47B 2031/008
See application file for complete search history.

(56) References Cited

U.S. PATENT DOCUMENTS

| | | | |
|---|---|---|---|
| 4,995,186 A | | 2/1991 | Collie |
| 5,186,675 A | * | 2/1993 | Stoddard .................. A63H 3/06 40/212 |
| 5,692,795 A | * | 12/1997 | Mininger ................ E04H 15/20 135/88.13 |
| 6,148,551 A | | 11/2000 | Glass |
| 6,186,857 B1 | * | 2/2001 | Gazit .................. G09F 15/0025 40/406 |

(Continued)

*Primary Examiner* — Shin H Kim
(74) *Attorney, Agent, or Firm* — Porter, Wright, Morris & Arthur, LLP (57) ABSTRACT

The present invention is a cart, kiosk, booth, equipment, machine (or similar) of any design or construction, mobile or stationary, integrated with an inflatable & deflatable advertising/signage/display/identity element. Inflatable & deflatable advertising, signage, display (or similar) identity elements can be configured in any; form, shape, size, color, etc. and therefore the present invention integrates carts, kiosks, booths (or similar) with inflatable & deflatable advertising/identity elements to improve the design and fabrication of carts, kiosks, booths (or similar).

20 Claims, 8 Drawing Sheets

(56) References Cited

U.S. PATENT DOCUMENTS

| | | | |
|---|---|---|---|
| 6,644,843 B2* | 11/2003 | Chin-Cheng | A63H 3/06 362/806 |
| 6,792,935 B2* | 9/2004 | Williams | A47J 37/0763 126/25 R |
| 6,874,263 B2 | 4/2005 | Ohmuku | |
| 7,216,446 B2 | 5/2007 | Machala | |
| 7,305,931 B1 | 12/2007 | Benson et al. | |
| 7,490,426 B2* | 2/2009 | Scarberry | G09F 15/0025 116/63 P |
| 8,635,794 B1* | 1/2014 | Thigpen | A63H 3/06 40/539 |
| 8,800,186 B2* | 8/2014 | Zhang | G09F 19/02 40/610 |
| 2004/0000774 A1* | 1/2004 | Zeuner | A47F 5/108 280/651 |
| 2007/0094907 A1* | 5/2007 | Scarberry | G09F 15/0025 40/610 |

* cited by examiner

CART, KIOSK, BOOTH, EQUIPMENT OR MACHINE INTEGRATED WITH AN INFLATABLE AND DEFLATABLE ADVERTISING, IDENTIFYING DISPLAY

CROSS-REFERENCE TO RELATED APPLICATIONS

This application is based on and claims priority to Provisional Patent Application No. 62/425,378 filed Nov. 22, 2017 entitled "Cart, Kiosk, Booth, Equipment or Machine Integrated with an Inflatable and Deflatable Advertising, Identifying Display", and which is hereby incorporated by reference in its entirety.

BACKGROUND OF THE INVENTION

Field of the Invention

The present invention is in the technical fields of both carts and kiosks and inflatable advertising. More particularly, the present invention is in the technical field of design and fabrication of carts, kiosks, booths, machines and equipment (or similar) integrating inflatable and deflatable advertising, signage, display or similar identity elements.

Typically, carts, kiosks, booths (or similar) have permanent or demountable identity elements, such as pictorial signs, facsimiles, or other solid—fixed form advertising that is used to attract customers, patrons or users to the cart, kiosk, vending machine, or similar piece of equipment or structure. These fixed form identity elements are also needed to inform those customers, patrons or users, what is being sold or provided at the cart, kiosk or similar. Many carts use large umbrellas as advertising to enhance visibility and attract and inform potential customers, patrons or users. The umbrella has several characteristics that work well with carts. One of those characteristics is that they expand to increase visibility and collapse to reduce size, enhance portability, are stored more easily and minimize the negative consequences of high wind. However, an expanded umbrella is still always just an umbrella varying in size and color(s). There also exists inflatable & deflatable advertising, signage, display (or similar) identity elements that are used to attract customers, patrons or users to a location, to sell or provide them with goods, services, information, or similar. The inflatable & deflatable advertising/identity elements have similar desirable characteristics to that of the umbrella, as they can collapse to reduce size, enhance portability, are stored more easily and minimize the negative consequences of high wind and expand to provide cover and increase visibility, attract and inform customers, patrons or users.

BRIEF SUMMARY OF THE INVENTION

The present invention is a cart, kiosk, booth, equipment, machine (or similar) of any design or construction, mobile or stationary, integrated with an inflatable & deflatable advertising/signage/display/identity element. Inflatable & deflatable advertising, signage, display (or similar) identity elements can be configured in any; form, shape, size, color, etc. and therefore the present invention integrates carts, kiosks, booths (or similar) with inflatable & deflatable advertising/identity elements to improve the design and fabrication of carts, kiosks, booths (or similar).

In one embodiment the present invention is an apparatus, including a support member having a height and a width, and inner and outer structures; an inflatable element having an outer surface, a lower portion and upper portion, the lower portion of the inflatable element mounted to the support member, engaging the support member so as to support and attach to the lower portion of the inflatable element; a blower for blowing air into the inflatable element, so as to inflate the inflatable element; the blower can be configured to deflate the inflatable element by drawing air out of the inflatable element; and the support member further having formed therein a storage area within the inner structure of the support member, the storage area formed so as to permit the storage of the inflatable element within the storage area. In other embodiment the apparatus is integrated into at least one of a cart, a kiosk, a booth, a machine, a second apparatus, or a second structure that can be utilized to vend or provide a product or a service. In other embodiment the apparatus is integrated with at least one of the cart, the kiosk, the booth, the machine, the second apparatus, or the second structure forming a unified structure for advertising or identifying a product or a service, and for providing a product or a service. In other embodiment the lower portion of the inflatable balloon engages the support member via a compression rope engaging a channel defined by the support member. In other embodiment there is further provided a light mounted within the inner structure of the support member, wherein the light is configured to illuminate the inflatable element.

In other embodiment the invention is an apparatus including a support member having a height and a width, and inner and outer structures; an inflatable element having an outer surface, a lower portion and upper portion, the lower portion of the inflatable element mounted to the support member, engaging the support member so as to support and attach to the lower portion of the inflatable element; a reversible blower for blowing air into the inflatable element, so as to inflate the inflatable element; the reversible blower is configured to deflate the inflatable element by drawing air out of the inflatable element; and the support member further having formed therein a storage area within the inner structure of the support member, the storage area formed so as to permit the storage of the inflatable element within the storage area. In other embodiment the apparatus is integrated into at least one of a cart, a kiosk, a booth, a machine, a second apparatus, or a second structure that can be utilized to vend or provide a product or a service. In other embodiment the apparatus is integrated with at least one of the cart, the kiosk, the booth, the machine, the second apparatus, or the second structure forming a unified structure for advertising or identifying a product or a service, and for providing a product or a service. In other embodiment the lower portion of the inflatable balloon engages the support member via a compression rope engaging a channel defined by the support member. In other embodiment there is further provided a light mounted within the inner structure of the support member, wherein the light is configured to illuminate the inflatable element.

DETAILED DESCRIPTION OF THE INVENTION

Figure 1:
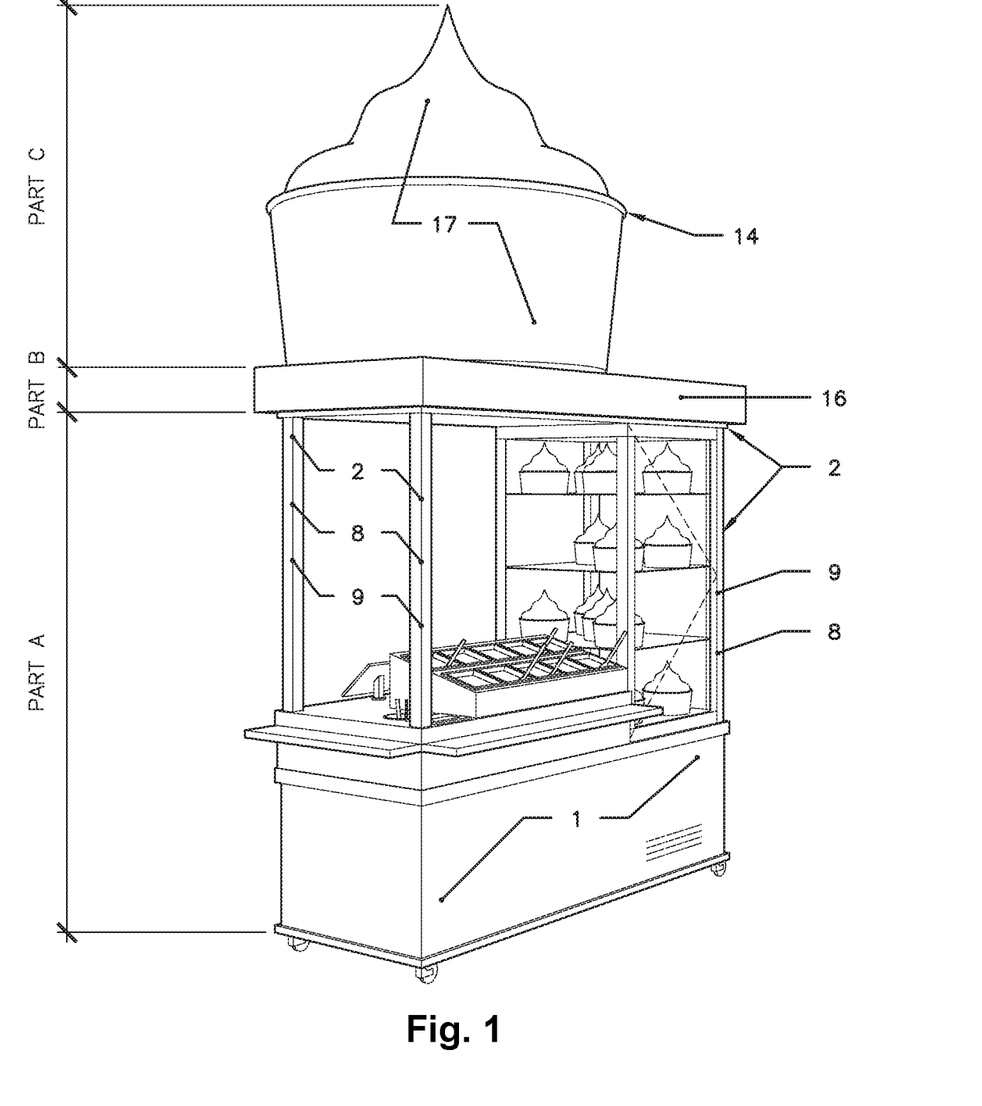
FIG. 1 is a perspective view of an example of a mobile sales cart integrated with an inflatable & deflatable advertising/signage/display/identity element, represented by the design of a frozen yogurt sales cart embodiment of the present invention.
Figure 2:
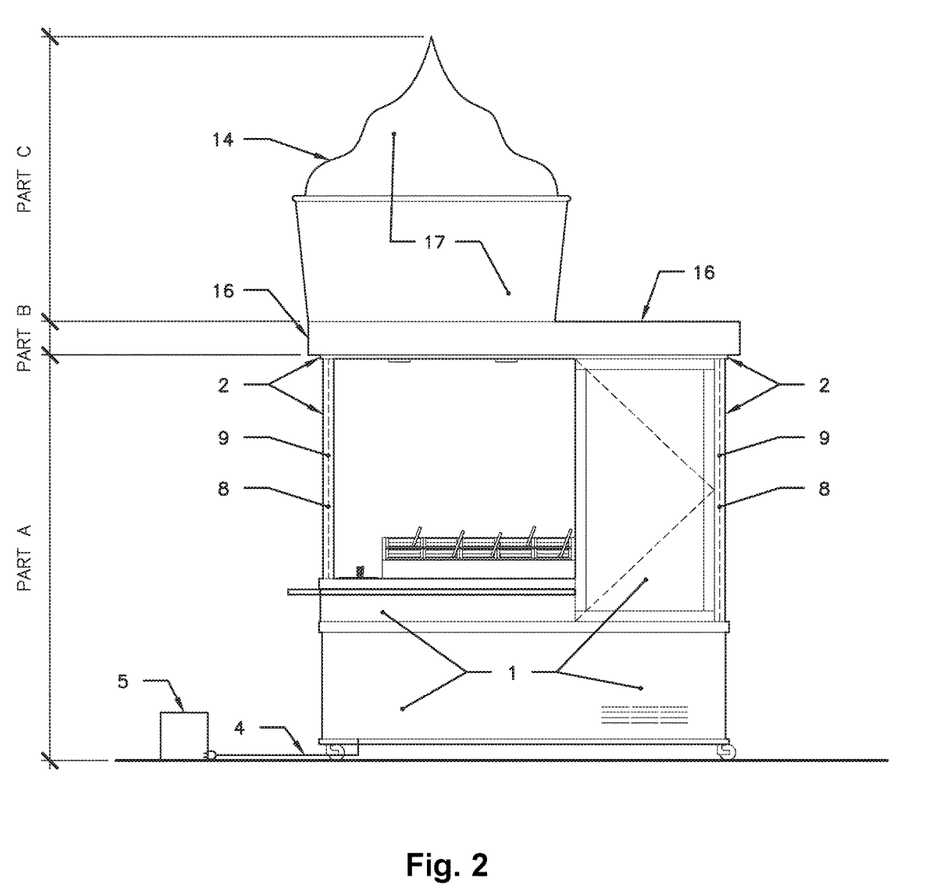
FIG. 2 is a front side view of an example of a mobile sales cart integrated with an inflatable & deflatable advertising/ signage/display/identity element, represented by the design of a frozen yogurt sales cart embodiment of the present invention.
Figure 3:
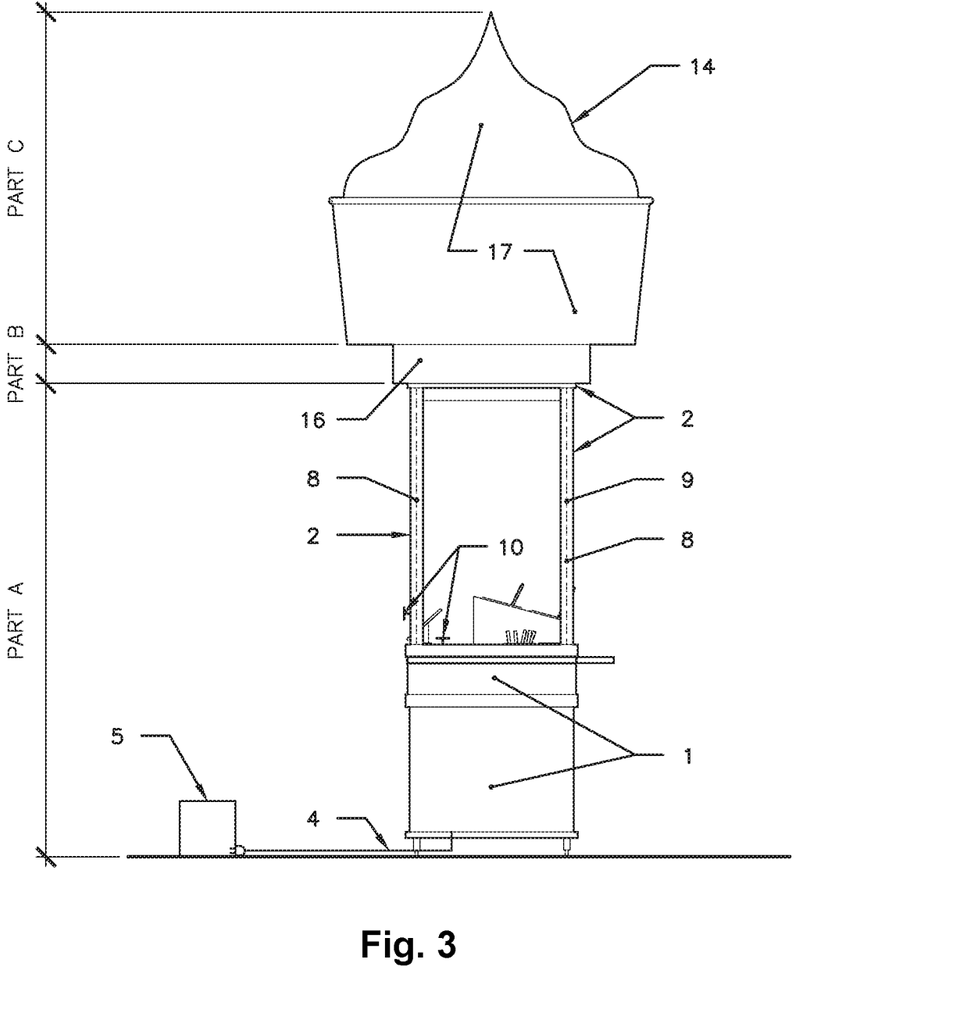
FIG. 3 is a side view of an example of a mobile sales cart integrated with an inflatable & deflatable/advertising/signage/display/identity element, represented by the design of a frozen yogurt sales cart embodiment of the present invention.
Figure 4:
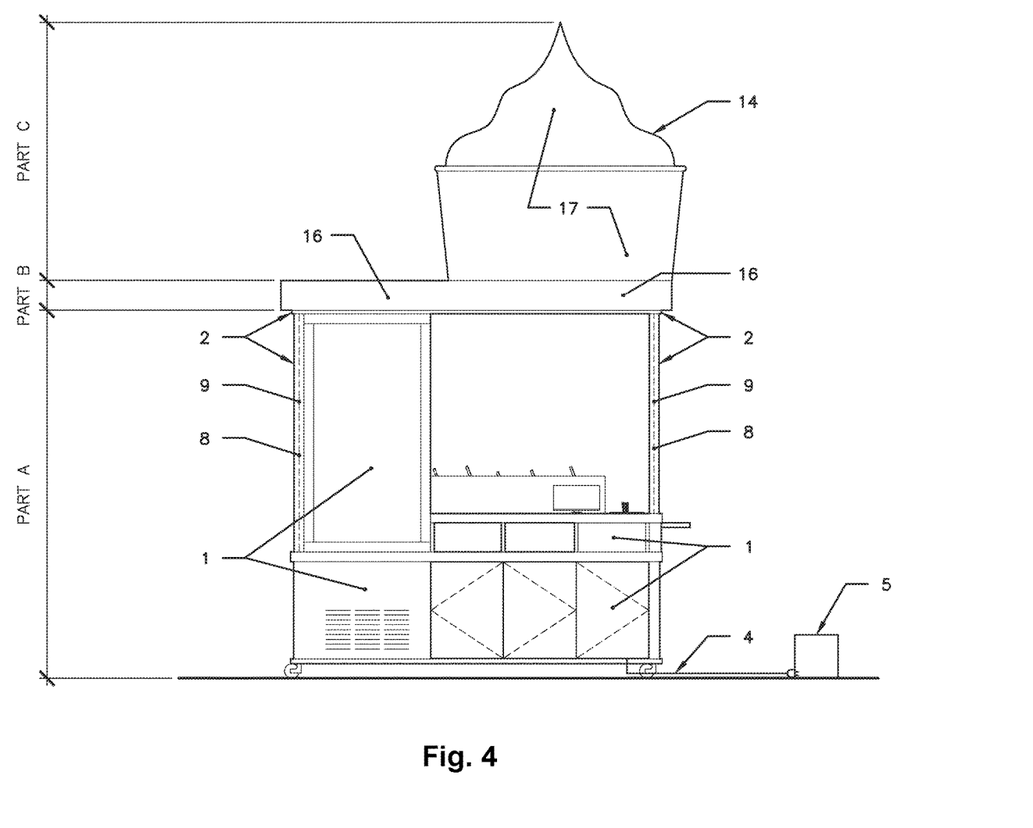
FIG. 4 is a rear side view of an example of a mobile sales cart integrated with an inflatable & deflatable advertising/signage/display/identity element, represented by the design of a frozen yogurt sales cart embodiment of the present invention.
Figure 5:
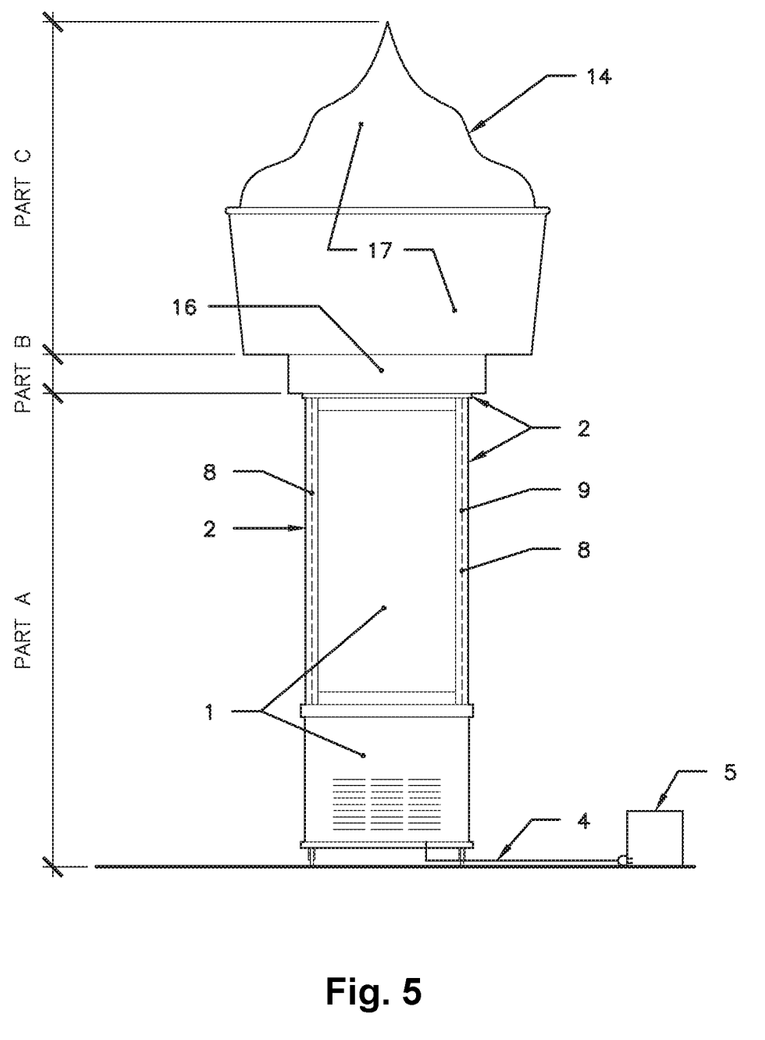
FIG. 5 is a side view of an example of a mobile sales cart integrated with an inflatable signage/display/identity element represented by the design of a frozen yogurt sales cart embodiment of the present invention.
Figure 6:
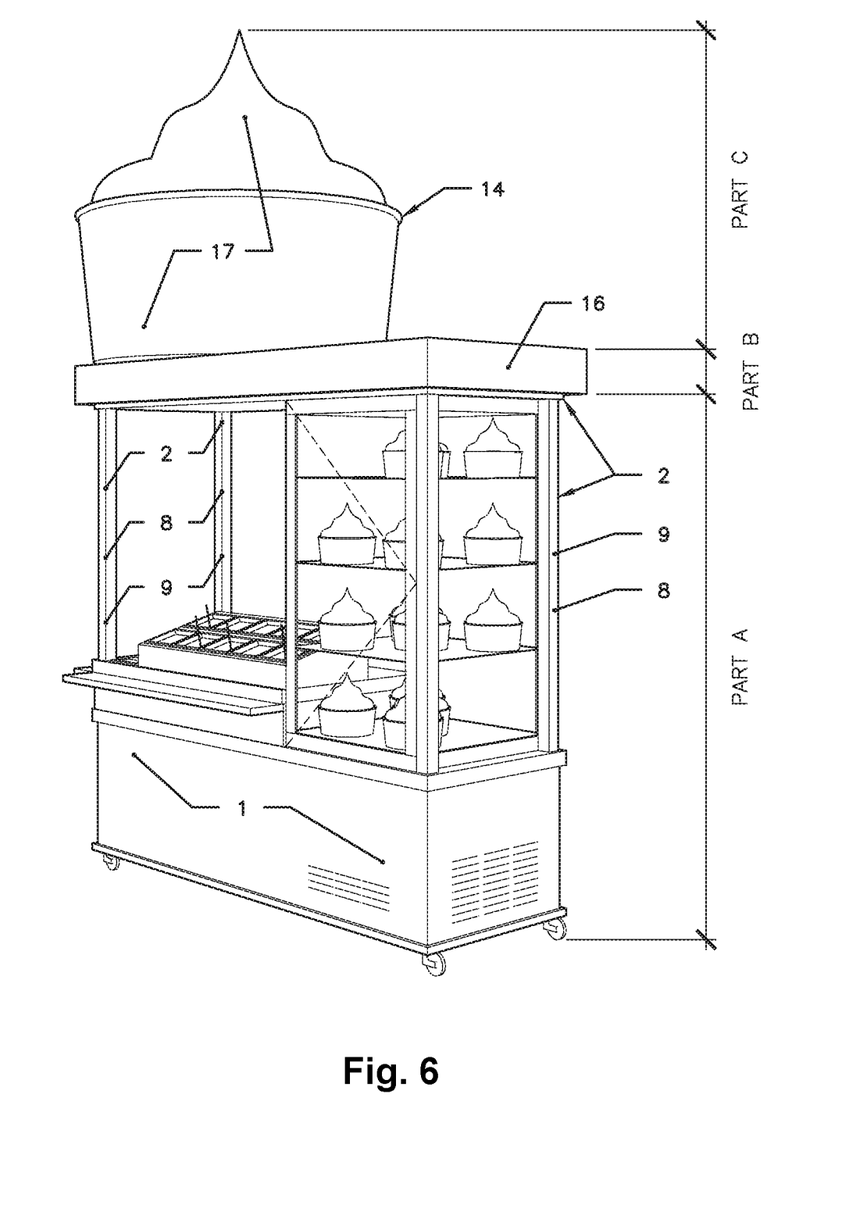
FIG. 6 is a perspective view of an example of a mobile sales cart integrated with an inflatable & deflatable advertising/signage/display/identity element, represented by the design of a frozen yogurt sales cart embodiment of the present invention.
Figure 7:
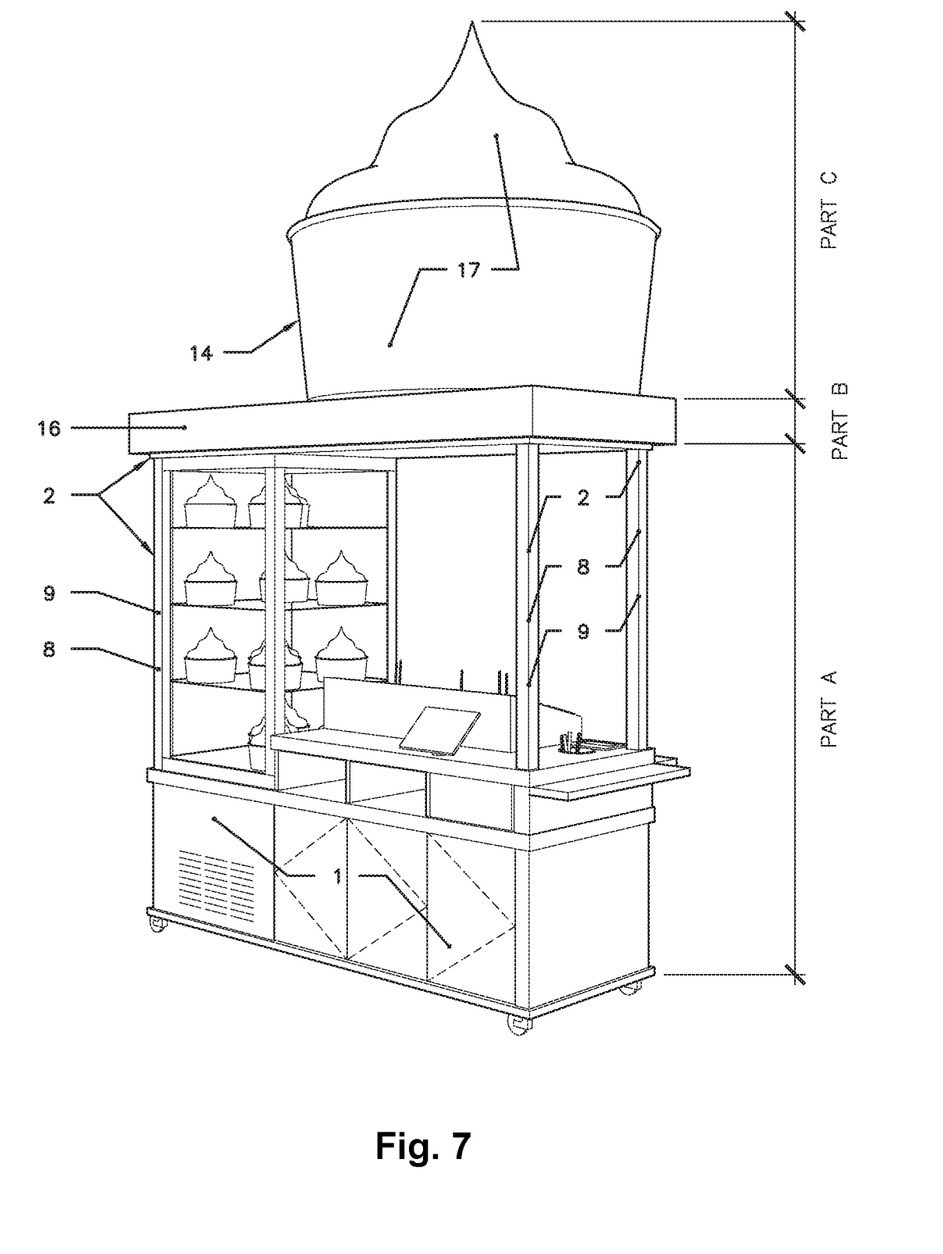
FIG. 7 is a perspective view of an example of a mobile sales cart integrated with an inflatable & deflatable advertising/signage/display/identity element represented by the design of a frozen yogurt sales cart embodiment of the present invention.
Figure 8:
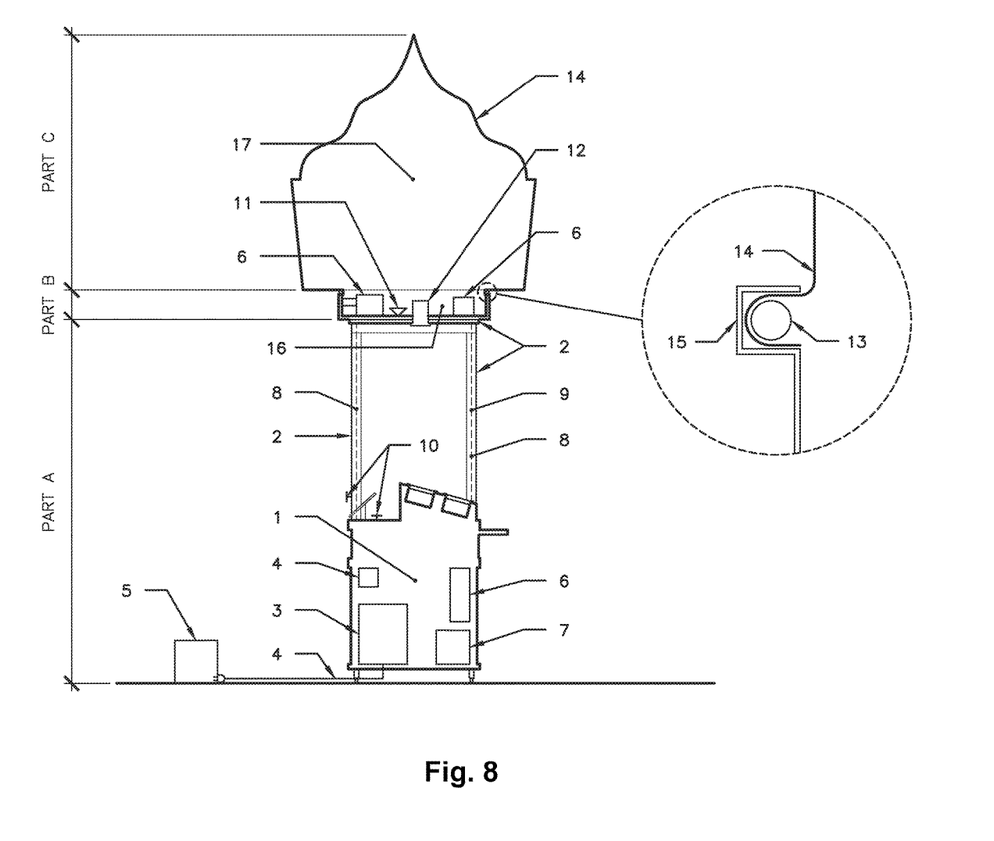
FIG. 8 is a section view of an example of a mobile sales cart integrated with an inflatable & deflatable advertising/signage/display/identity element represented by the design of a frozen yogurt sales cart embodiment of the present invention.

Referring now to the invention in more detail, in FIG. 1 through FIG. 8 there is shown an example of the invention, with a cart, kiosk, booth, equipment, machine or similar, of any design or construction, mobile or stationary that has a lower section, noted as Part A that is configured to the requirements of the goods, services, information, entertainment, shelter, etc., that are being provided. Next there is an accessible box, tray, vessel or container that is noted as Part B, that is configured to receive the inflator & deflator unit(s), has a protected (screened, louvered or similar) air intake and discharge opening(s) or orifice(s), optional lighting fixture(s) (projector(s) or similar) and the attachment of the self-storing inflatable & deflatable advertising/signage/display/identity element (Part C). Part C is an inflatable & deflatable advertising/signage/display/identity element which shall be configured to be attached to and stored within Part B and as inflatable advertising, signage, display (or similar) identity element for the goods, services, information, entertainment, shelter, etc. that is being sold, vended or provide by the Part A cart, kiosk, booth, equipment or machine. In the example of the present invention, of a frozen yogurt sales cart with an integrated inflatable and deflatable signage/display/identity element (shown as a large cup of frozen yogurt), the integration of Parts A, B, and C are shown stacked vertically, however other arrangements of the integration of the parts is possible and a configuration in which Parts B & C are integrated horizontally adjacent to Part A is also a valid configuration of the present invention.

In more detail, still referring to the invention of FIGS. 1-8, a description of the (3) three parts (A, B & C) and how they integrate follows:

Part A: Consists of a cart, kiosk, booth, machine, equipment, (or similar such as a; food sales cart, a bicycle rental kiosk, a picture (selfie) booth, a vending machine, an arcade game, or similar) that is designed to sell, vend or provide goods, services, information, entertainment, shelter, etc. either staffed (by people), unstaffed or automated (such as is done with vending machines). Part A can be designed to be any size, shape, color(s) and can be built from any combination of materials (such as metals, wood, plastics, etc.), suitable for the purpose of the cart, kiosk, booth (or similar) and to integrate with Parts B & C. Part A can be stationary and permanent (fixed in its location and not intended to disassemble), semi-permanent (seasonal or configured for decommissioning at times or disassembled and stored or relocated to another semi-permanent location) and mobile (configured to be easily moveable with wheels or disassembled, transported and reassembled). Part A can be configured to be; self-powered (by a fueled generator, solar or wind energy generator, battery, etc.), connected to a remote power source or unpowered. Part A can integrate with other equipment or machines suitable for the purpose of the cart, kiosk and booth (or similar). Part A can also integrate with other advertising, signage, displays, and identity elements.

Part B: Consists of a box, tray, vessel, container, or similar, that is configured to provide the transition for the integration of Part A with Part C. This part of the invention is also intended to store Part C in the deflated state. Part B can also be designed to be any size, shape, color(s) and can be built from any combination of materials (such as metals, wood, plastics, etc.), that are compatible with the materials in Part A and Part C and suitable for the purpose of creating the transition for the integration of Part A with Part C. Part B can be designed to serve other functions other than the transition for the integration of Part A with Part C. The devices for inflating and deflating Part C can be located within Part B, lighting devices for illuminating both Part A and Part C can be located within Part B. Any items that benefit the use of the invention but do not impede the transition for the integration of Part A with Part C, can be located on or within Part B.

Part C: Consists of the inflatable & deflatable advertising/signage/display/identity element also known as but not limited to the inflatable advertising field. Part C can be designed for a continuously operating inflator unit, having a self-closing and opening mechanism for relieving excess air and/or to create movement, or a sealed inflatable & deflatable signage/display/identity element to be inflated to a semi-rigid form by operating the inflator/deflator unit(s) until full inflation or deflation is completed. The inflatable & deflatable signage/display/identity element is fabricated from a flexible fabric sheet material commonly used for inflatable advertising products (such as weather and UV resistant coated nylon or similar fabrics), and designed as required to meet the advertising/signage/display/identity element requirements of the items (goods, services, etc.) being provided from Part A.

Referring now to the invention in more detail, in FIGS. 1-8, there is shown an example of the present invention, represented by the design of a 'frozen yogurt sales cart' as an example of a cart integrated with an inflatable & deflatable advertising/signage/display/identity element (appearing as a large scale inflated cup of frozen yogurt). In this example of the invention, the integration of Parts A, B and C are in the vertically stacked configuration. Beginning with Part A there is shown a mobile sales cart 1, with a structure 2 that supports Part B 16 & Part C 17. The cart, kiosk 1 (or similar), can house a power source 3 (such as a generator), or connection devices 4 (such as electric cords and connectors), to a remote power source 5 (such as an electrical outlet or generator). The cart or kiosk 1 can also contain the inflator/deflator device(s) 6, or manual air pump 7. The structure 2, can be used as a conduit —8, for connecting a power source 5, control wiring 9, control operators & devices 10 (such as switches), to Part B 16, or even provide airways to Part B 16 & Part C 17 if the inflator/deflator unit 6 is located in the cart or kiosk 1. Part B 16 is represented by a rectangular tray shaped box—16 that is supported by the cart structure 2. This box 16 is accessed from a partially open top and is shown with the inflator & deflator device—6, air intake & discharge openings, orifices (or similar) 18, up lighting fixtures 11 (illuminating Part C, the inflated advertising) and down lighting fixtures 12 (illuminating Part A 1 the frozen yogurt sales cart). The Part B box 16 is also shown with a compression rope 13 locking the Part C fabric 14 into a U shaped channel 15 as an example of one method for attaching Part C (the inflatable & deflatable advertising/signage/display/identity element) 17 to the Part B (the transition box) 16 and integrating it with the Part A (the frozen yogurt sales cart) 1. The methods of the attachment of Part B (the transition box) 16 to both Part C (the inflatable & deflatable advertising/signage/display/identity element) 17 and the Part A (Cart, Kiosk, Booth, Equipment or Machine) 1, may vary and the present invention is not specific to any one method of attachment.

In further detail, still referring to the invention of FIGS. 1-8, The present invention is also not specific to the methods, devices, or apparatus (inflator/deflator device(s) 6, or manual air pump 7) used for the inflation and deflation of Part C 17. Several options are described for clarification of the options considered and included in the claims of this invention, as follows:

- A switchable inflator & deflator unit (inflator/deflator device(s) 6) can consist of a blower unit (electric fan, air compressor or similar) and/or a manual air pump 7 (as primary or backup) and have the ability to reverse the air direction switching the function from inflation to deflation. The reversing of air direction can be either automated via electrical or mechanical controls of the blower unit or manually by reversing the orientation of the bower unit or by means of opening and closing airways (also manually or automated).
- A dual blower configuration, 1 blower unit for inflation and 1 blower unit for deflation could also be implemented as a valid configuration of this invention.
- Manual inflation and deflation via hand or foot operated air pumps or human lung power for inflating Part C is a valid configuration of this invention. Gravity deflation or manually (human energy) forcing the air out of Part C is a valid configuration of this invention.
- All configurations that allow Part C to be inflated and deflated as described or not described are intended to be included in the present invention of the design and fabrication of carts, kiosks, booths (or similar) integrated with an inflatable and deflatable advertising/signage/display/identity element.

Referring now to the invention shown in FIGS. 1-8, the present invention of integrating inflatable & deflatable advertising (Parts B & C) with a cart, kiosk, booth, equipment or machine (Part A) to sell, vend or provide goods, services, information, entertainment, shelter, etc. also applies to retrofitting an existing cart, kiosk, booth, equipment or machine with a transition for the integration of an inflatable & deflatable advertising signage/display/identity element (Parts B & C). The present invention applies to all instances where the technical fields of carts, kiosks, booths, equipment or machines (Part A) are combined and integrated with an inflatable & deflatable advertising signage/display/identity element (Parts B & C).

The advantages of the present invention include, without limitation, the ability of having the portability, impact and large scale visibility of inflatable advertising/signage/display/identity elements at a small scale cart, kiosk, booth, equipment or machine, when competing for attention to sell, vend or provide goods, services, information, entertainment, shelter, etc. at venues where the increased visibility and impact will increase patronage. The integration of these technical fields of carts and kiosks and inflatable advertising can also reduce setup and teardown time also enhancing the ability to react to changing weather conditions and the portability of the cart, kiosk, booth, equipment or machine.

In one embodiment, the present invention is a cart, kiosk, booth, equipment or machine (Part A) of any design or construction, mobile or stationary, integrated with an inflatable & deflatable advertising/signage/display/identity element (Part C) by means of a box, tray, vessel, container or similar (Part B), that is configured to provide the transition for the integration of Part A with Part C.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:
1. An apparatus comprising:
   a support member having a height and a width, and inner and outer structures;
   an inflatable element having an outer surface, a lower portion and an upper portion, said lower portion of said inflatable element mounted to said support member, engaging said support member so as to support and attach to said lower portion of said inflatable element;
   a blower for blowing air into the inflatable element, so as to inflate said inflatable element;
   wherein said blower can be configured to deflate the inflatable element by drawing air out of the inflatable element;
   wherein said support member further having formed therein a storage area within said inner structure of said support member, said storage area formed so as to permit storage of said inflatable element within said storage area; and
   wherein said lower portion of said inflatable element engages said support member via a compression rope engaging a channel defined by said support member.

2. The apparatus of claim 1, wherein said support member is integrated into at least one of a cart, a kiosk, a booth, a machine that is configured to vend or provide a product or a service.

3. The apparatus of claim 2, wherein said support member is integrated with the at least one cart, kiosk, booth, or machine forming a unified structure for advertising or identifying the product or the service, and for providing the product or the service.

4. The apparatus of claim 1, further comprising a light mounted within said inner structure of said support member, wherein the light is configured to direct illumination within said inflatable element to illuminate the inflatable element.

5. An apparatus comprising:
   a support member having a height and a width, and inner and outer structures;
   an inflatable element having an outer surface, a lower portion and an upper portion, said lower portion of said inflatable element mounted to said support member, engaging said support member so as to support and attach to said lower portion of said inflatable element;
   at least one blower for selectively blowing air into the inflatable element to inflate said inflatable element and selectively drawing air out of the inflatable element to deflate said inflatable element;
   wherein said support member further having formed therein a storage area within said inner structure of said support member, said storage area formed so as to permit storage of said inflatable element within said storage area; and
   wherein said support member is integrated into at least one of a cart, kiosk, booth, or machine that is configured to vend or provide a product or a service.

6. The apparatus of claim 5, wherein said ort member is integrated with the at least one cart, kiosk, booth, machine forming a unified structure for advertising or identifying the product or the service, and for providing the product or the service.

7. The apparatus of claim 5, wherein said lower portion of said inflatable element engages said support member via a compression rope engaging a channel define by said support member.

8. The apparatus of claim 5, further comprising a light mounted within said inner structure of said support member, wherein the light is configured to direct illumination within said inflatable element to illuminate the inflatable element.

9. The apparatus of claim 1, wherein said at least one blower is a reversible blower.

10. The apparatus of claim 2, wherein said support member is configured as a shelter element for said at least one cart, kiosk, booth, or machine.

11. The apparatus of claim 5, wherein said at least one blower is a reversible blower.

12. The apparatus of claim 5, wherein said support member is configured as a shelter element for said at least one cart, kiosk, booth, or machine.

13. A cart, kiosk, booth, or machine comprising:
    a lower structure configured to vend or provide a product or service;
    a support member secured to said lower structure so that said lower structure supports said support member above said lower structure;
    an inflatable element having an outer surface, a lower portion and an upper portion;
    at least one blower configured to selectively blow air into said inflatable element to inflate said inflatable element and to selectively draw air out of said inflatable element to deflate said inflatable element;
    wherein said lower portion of said inflatable element is mounted to said support member so as to support said inflatable element above said support member when said inflatable element is inflated;
    wherein said support member has a storage area configured for selectively storing said inflatable element within said storage when said inflatable element is deflated.

14. The cart, kiosk, booth, or machine of claim 13, wherein said lower portion of said inflatable element engages said support member via a compression rope engaging a channel define by said support member.

15. The cart, kiosk, booth, or machine of claim 13, further comprising a light mounted within said support member and configured to direct illumination within said inflatable element to illuminate said inflatable element.

16. The cart, kiosk, booth, or machine of claim 13, further comprising a light mounted within said support member and configured to direct illumination downward toward said lower structure.

17. The cart, kiosk, booth, or machine of claim 13, wherein said support member is configured as a shelter element for said lower structure.

18. The cart, kiosk, booth, or machine of claim 13, wherein said at least one blower is located within said support member and at least one opening in said support member for the passage of air between atmosphere surrounding the support member and the at least one blower within said support member.

19. The cart, kiosk, booth, or machine of claim 13, wherein said at least one blower is located within said lower structure and at least one opening in said lower structure for the passage of air between atmosphere surrounding the lower structure and the at least one blower within said lower structure.

20. The cart, kiosk, booth, or machine of claim 13, wherein said at least one blower is a reversible blower.

* * * * *